United States Patent
Szolyga et al.

(10) Patent No.: US 7,715,206 B2
(45) Date of Patent: May 11, 2010

(54) SYSTEM BOARD WITH EDGE CONNECTOR

(75) Inventors: Thomas H. Szolyga, Saratoga, CA (US); Jean-Paul Moiroux, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/829,725

(22) Filed: Jul. 27, 2007

(65) Prior Publication Data

US 2009/0031068 A1    Jan. 29, 2009

(51) Int. Cl.
*H05K 1/14*    (2006.01)
(52) U.S. Cl. .................. 361/784; 361/785; 361/788; 361/803; 439/65; 439/61; 439/62; 439/50
(58) Field of Classification Search ................. 361/683, 361/760, 788, 796, 785, 784, 803; 439/50, 439/61, 62, 65
See application file for complete search history.

(56) References Cited

U.S. PATENT DOCUMENTS

| | | | | |
|---|---|---|---|---|
| 4,400,049 A | * | 8/1983 | Schuck | 439/631 |
| 5,205,753 A | * | 4/1993 | Butterfield et al. | 439/157 |
| 5,295,852 A | | 3/1994 | Renn et al. | |
| 5,631,805 A | * | 5/1997 | Bonsall | 361/679.27 |
| 5,636,101 A | * | 6/1997 | Bonsall et al. | 361/679.27 |
| 5,648,891 A | * | 7/1997 | Gierut | 361/788 |
| 5,923,529 A | | 7/1999 | Mimachi | |
| 5,949,656 A | * | 9/1999 | Pinault | 361/788 |
| 6,038,138 A | * | 3/2000 | Dayton et al. | 361/796 |
| 6,075,704 A | * | 6/2000 | Amberg et al. | 361/736 |
| 6,122,161 A | * | 9/2000 | Gierut | 361/683 |
| 6,160,701 A | * | 12/2000 | Baker et al. | 361/679.27 |
| 6,328,598 B1 | * | 12/2001 | Harris, Jr. | 439/516 |
| 6,496,376 B1 | * | 12/2002 | Plunkett et al. | 361/729 |
| 6,608,755 B2 | * | 8/2003 | Baldwin et al. | 361/729 |
| 6,625,035 B1 | * | 9/2003 | Steinman et al. | 361/759 |
| 6,639,806 B1 | * | 10/2003 | Chuang et al. | 361/748 |
| 6,644,979 B2 | | 11/2003 | Huang | |
| 6,798,649 B1 | * | 9/2004 | Olodort et al. | 361/683 |
| 7,632,114 B2 | * | 12/2009 | Danner | 439/131 |
| 2007/0130404 A1 | * | 6/2007 | Huang et al. | 710/100 |
| 2008/0201843 A1 | * | 8/2008 | Bendele et al. | 5/83.1 |

OTHER PUBLICATIONS

International Search Report mailed Jan. 14, 2009, 10 pp.; PCT Pat App. No. PCT/US2008/007405, filed Jun. 13, 2008.

* cited by examiner

*Primary Examiner*—Dameon E Levi

(57) ABSTRACT

A system comprises a chassis and a system board contained within the chassis. The system board has an edge connector adapted to receive an add-in card in a configuration in which the system board and add-in card are substantially co-planar.

21 Claims, 1 Drawing Sheet

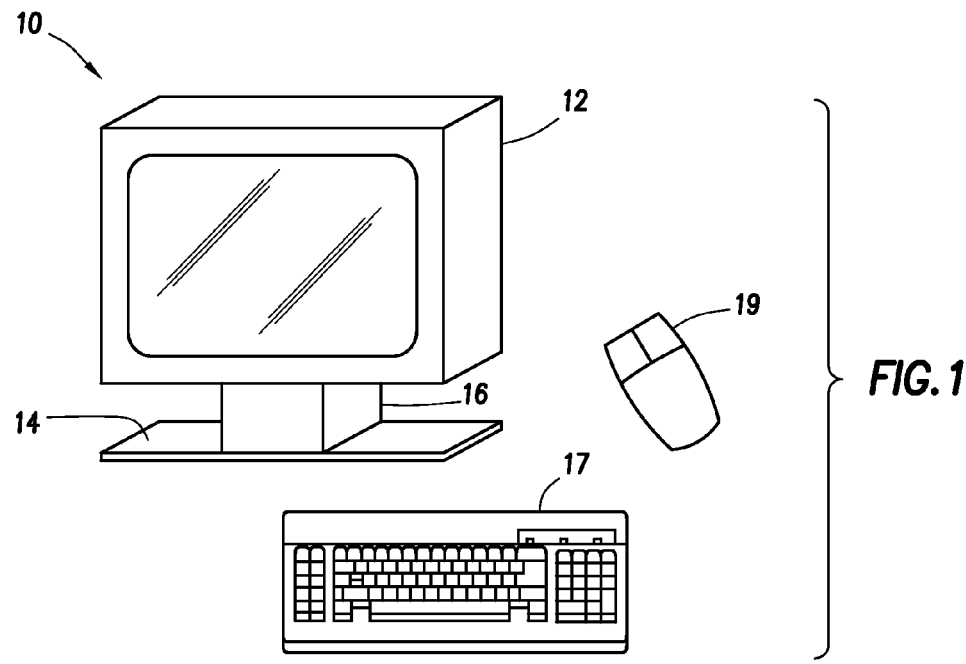
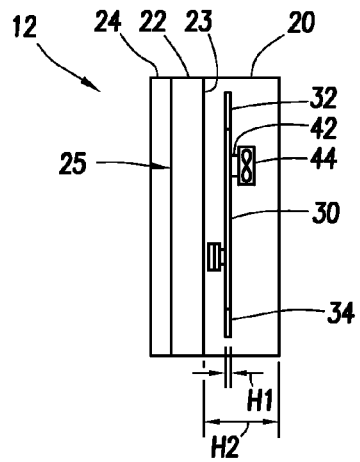
FIG.2
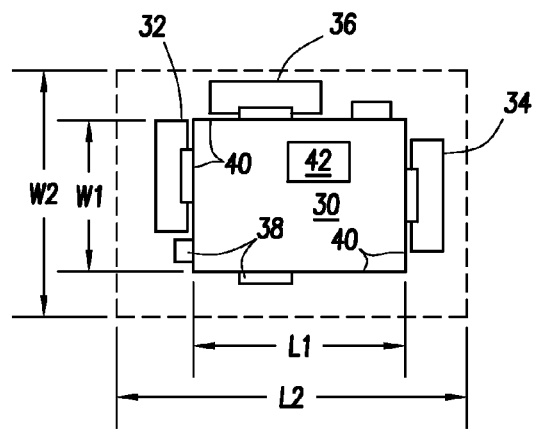
FIG.3
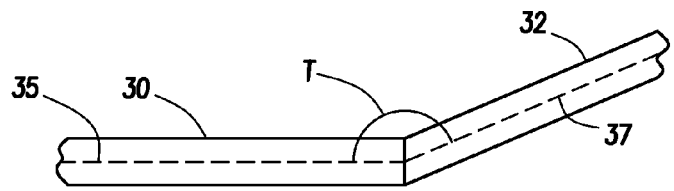
FIG.4

SYSTEM BOARD WITH EDGE CONNECTOR

BACKGROUND

Reducing the size of electronic systems such as computers is desirable for at least some types of systems. For example, an "all-in-1" computer system comprises a display and system board in one structure. Incorporating add-in cards into such systems is problematic.

BRIEF DESCRIPTION OF THE DRAWINGS

For a detailed description of exemplary embodiments of the invention, reference will now be made to the accompanying drawings in which:

FIG. 1 shows a system in accordance with various embodiments;

FIG. 2 shows a side view of the system of FIG. 1 in accordance with various embodiments;

FIG. 3 shows a top view of a system board employed in the system of FIG. 1 in accordance with various embodiments; and FIG. 4 shows a side view of an add-in card inserted into, and substantially co-planar with, a system board in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

FIG. 1 shows a system 10 in accordance with various embodiments. As shown, system 10 comprises a computing apparatus 12 supported by a support structure 16 over a base 14. The base 14 is adapted to rest on a surface such as a work surface (e.g., a desk, table, etc.). The computing apparatus 12 comprises a display as well as a system board. The system board comprises various electronic components such as memory and a processor. FIG. 1 also a keyboard 17 and a mouse 19 usable to provide input to the computing apparatus 12. Other or different input devices can be used as well.

In some embodiments, the system 10 comprises an "all-in-1" system meaning that the apparatus 12 comprises a display and a system board. In such embodiments, a separately provided chassis electrically cabled to a display is not provided. In the embodiment depicted in FIG. 1, the computing apparatus 12 is positioned vertically in front of a user. In other embodiments, the computing apparatus 12 rests flat on the work surface (i.e., the support structure 16 and base 14 are not provided).

FIG. 2 illustrates a side view of the computing apparatus 12. In the embodiment of FIG. 2, the computing apparatus 12 comprises a chassis 20 mated (via adhesive, screws, rivets, etc.) to a rear surface 23 of a display 22. A touch sensitive member 24 is also provided as part of the computing apparatus 12. The touch sensitive member 24 is mated (via adhesive, screws, rivets, etc.) to a front surface 25 of the display 22. The display 22 is thus sandwiched between the touch sensitive member 24 and the chassis 20. The touch sensitive member 24 permits a user to operate the system 10 by touching various areas on the member 24. For example, icons displayed on display 22 can be "touched" by the user to select such icons. In such embodiments, the system 12 comprises a touch-sensitive display.

FIG. 3 illustrates a top view of a system board 30 that may be contained within the chassis 20. As shown, the system board 30 has a length (L1) and a width (W1). The chassis 20 in which the system board 30 is mounted has a length (L2) and a width (W2). The system board 30 is of a size that fits within the area defined by L2 and W2 of the chassis. That is, L1 is less than L2 and W1 is less than W2. The length (L2) and width (W2) of the chassis 20 is generally the same, or smaller, as the corresponding length and width of the display 22. As a result, the length (L1) and width (W1) of the system board 30 is generally the same, or smaller, as the length and width of the display 22.

Referring still to FIG. 3, the system board 30 has one or more edge electrical connectors 38. The edge connectors 38 can be provided on any one or more of the sides 40 of the system board. As such, in some embodiments, at least one edge connector 38 is oriented orthogonally from at least one other edge connector. Some of the edge connectors 38 may be of a different size and/or pin-out as other edge connectors.

Each edge connector 38 is adapted to receive and add-in card, such as add-in cards 32, 34, and 36 shown in FIG. 3. Add-in cards 32 and 34 are also shown in the side view of FIG. 2. Each add-in card has an edge connector that mates with an edge connector 38 of the system board 30. Because the add-in cards 32, 34, 36 connect to the sides 40 of the system board 30, the system board 30 and its ad-in cards are provided in a substantially co-planar configuration. As a result, the height of the system board 30 and add-in cards 32, 34, and 36 is less than would be the case if the add-in cards connect to the system board 30 at an orthogonal angle to the plane of the system board. In some embodiments, all add-in cards of a given system 100 are substantially co-planar with respect to the system board 30.

In this disclosure, the term "substantially co-planar" is defined with regard to FIG. 4 which shows the system board 30 electrically connected to an add-in card 32 at an exaggerated angle T. The angle T defines the angle between a plane 35 of the system board 30 and a plane 37 of the add-in card 32. In at least some embodiments, substantially co-planar means that angle T is less than 5 degrees. In other embodiments, the maximum value of angle T can be other than 5 degrees.

The system's processor may be provided on the system board 30. An example of a processor 42 is shown in FIGS. 2 and 3. In some embodiments, the processor 42 and other electrical components may be mounted on the surface of the system board 30 opposite to the display 22. By providing the add-in cards on the sides of the system board 30, extra room is provided for a thermal cooling device (e.g., a heat sink, liquid cooling device, heat pipe, etc.) to cool, for example, the processor 42. Because the processor 42 is positioned generally adjacent an external surface of the chassis 20, external cooling devices can be readily used and attached to the processor. The height (H1) of the system board 30, add-in cards 32-36, processor 42 and thermal cooling device 44 is kept to a minimum and is less than otherwise would be the case if the add-in cards were connected to the system board 30 at an orthogonal angle to the plane of the system board. In some embodiments, H1 is less than 1.25 inches. In such embodiments, the thickness (H2) of the chassis 20 is less 1.5 inches.

An add-in card may perform any function desired. Examples include, memory cards, graphics card, network interface controllers, wireless cards, etc. Some add-in cards comprise Universal Serial Bus (USB)-compatible cards. Other types of electrical interfaces (e.g., Peripheral Component Interconnect (PCI)) may be implemented as well, as desired. Add-in cards having different electrical interfaces may be provided in the chassis 20 and connected to the system board 30. That is, at least one of the add-in cards may have a different electrical interface than at least one other add-in card. In other embodiments, all of the add-in cards have the same electrical interface.

Further still, with the configuration depicted in FIGS. 1-3, a system manufacturer can assemble systems 10 with varying system boards 30, add-in cards 32-36, etc. without having to construct a custom design with each such configuration. In some embodiments, the same add-in card can be connected to a variety of different system boards (varying, for example, by size), thereby making it easier for third parties to provide add-in cards that can fit in a variety of different systems 100.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
 a chassis; and
 a system board contained within said chassis, said system board comprising an edge connector adapted to receive an add-in card, and wherein the system board comprises a system processor;
 an add-in card comprising an edge connector that is mated to said system board edge connector such that said system board and said add-in card are substantially co-planar, wherein said add-in card comprises a memory card, a graphics card, a network interface controller, a wireless card, or any combinations thereof; and
 a display mated to said chassis;
 wherein said chassis is mated to a rear surface of said display
 wherein said system board comprises a second edge connector and the edge connector and the second edge connector differ in type; and wherein said edge connector and said second edge connector lie along different edges of said system board.

2. The system of claim 1 wherein said system board comprises a plurality of edge connectors, each edge connector adapted to receive a separate add-in card in a configuration in which said system board and said add-in cards are substantially co-planar.

3. The system of claim 2 wherein at least one system board edge connector comprises a Peripheral Component Interconnect (PCI) interface.

4. The system of claim 2 wherein at least one system board edge connector is provided on said system board along a different edge than at least one other edge connector.

5. The system of claim 1 further comprising a touch-sensitive member adjacent said display.

6. The system of claim 1 wherein said chassis has a thickness of less than 1.5 inches.

7. The system of claim 5 wherein said touch-sensitive member is mated to a front surface of said display.

8. The system of claim 1 wherein said system board comprises a processor mounted on a side of said system board opposite said display.

9. The system of claim 2 wherein said add-in cards differ in type.

10. The system of claim 2 wherein said system board can be replaced with another system board, differing in size, without replacing said add in cards.

11. A system, comprising:
 a chassis;
 a system board contained within said chassis, the system board comprising a plurality of edge connectors;
 a plurality of add-in cards, each comprising an edge connector; and
 a display mated to said chassis;
 wherein each system board edge connector is adapted to receive a separate add-in card edge connector such that said system board and said add-in cards are substantially co-planar;
 wherein said chassis is mated to a rear surface of said display
 wherein at least two of said system board edge connectors differ in pinout and are provided on different edges of said system board.

12. The system of claim 11 further comprising a touch-sensitive member adjacent said display.

13. The system of claim 12 wherein said touch-sensitive member is adjacent to a front surface of said display.

14. The system of claim 11 wherein said chassis has a thickness of less than 1.5 inches.

15. The system of claim 11 wherein at least one system board edge connector is provided on said system board along a different system board edge than at least one other system board edge connector.

16. The system of claim 11 wherein said add-in cards differ in type.

17. The system of claim 11 wherein said system board can be replaced with another system board, differing in size, without replacing said add in cards.

18. A system, comprising:
 a chassis;
 a system board contained within said chassis, the system board comprising a plurality of edge connectors, and wherein the system board comprises a system processor;
 a plurality of add-in cards, each comprising an edge connector;
 a display mated to said chassis; and
 a touch-sensitive member adjacent said display;
 wherein each system board edge connector is adapted to receive a separate add-in card edge connector such that said system board and said add-in cards are substantially co-planar;
 wherein said chassis is mated to a rear surface of said display and said touch-sensitive member is adjacent to a front surface of said display;
 wherein said chassis has a thickness of less than 1.5 inches;
 wherein at least one system board edge connector is provided on said system board along a different system board edge than at least one other system board edge connector; and
 wherein at least two of said system board edge connectors differ in type.

19. The system of claim 1, wherein the system board edge connectors differ in pinout.

20. The system of claim 11, wherein the plurality of add-in cards comprise a memory card, a graphics card, a network interface controller, a wireless card, or any combinations thereof.

21. The system of claim 11, wherein the system board comprises a system processor.

* * * * *